United States Patent [19]
Stiefel

[11] 4,056,688
[45] Nov. 1, 1977

[54] TELEPHONE RANGE EXTENDER WITH GAIN

[75] Inventor: Kenneth Erwin Stiefel, Randolph Township, Morris County, N.J.

[73] Assignee: Bell Telephone Laboratories, Incorporated, Murray Hill, N.J.

[21] Appl. No.: 740,854

[22] Filed: Nov. 11, 1976

[51] Int. Cl.$^2$ .................. H04M 1/76; H04B 3/16
[52] U.S. Cl. ..................... 179/16 F; 179/170 G
[58] Field of Search ............ 179/16 F, 170 R, 170 G, 179/16 EA

[56] References Cited

U.S. PATENT DOCUMENTS

| | | | |
|---|---|---|---|
| 1,955,681 | 4/1934 | Mouradian | 179/170 G |
| 3,671,676 | 6/1972 | Henry et al. | 179/16 F |
| 3,784,756 | 1/1974 | Nemchik | 179/16 F |
| 3,828,281 | 8/1974 | Chambers, Jr. | 179/170 G |

OTHER PUBLICATIONS

J. Nemchik; "The Range Extender With Gain – A New Telephone System Loop Extender"; IEEE Transactions on Communications; May 1974; pp. 681–684.

*Primary Examiner*—Kathleen H. Claffy
*Assistant Examiner*—Randall P. Myers
*Attorney, Agent, or Firm*—Robert O. Nimtz

[57] ABSTRACT

A telephone Range Extender with Gain (REG) is disclosed for extending the range of loop lengths over which telephone service can be provided. This is accomplished by providing voice frequency gain, a higher voltage talking battery, and supervisory and signaling circuitry for increasing the level of supervisory and signaling currents at the central office end.

The range extender requires no adjustment for loops of different lengths. A $\pi$ configuration negative impedance amplifier includes an adjustable gain circuit responsive to the resistance of the connected loop to automatically adjust the gain of the amplifier to the length of the loop. At the same time, an impedance matching circuit is transformer-coupled to the loop. The frequency shaping of the negative resistance amplifier and the impedance matching network, when reflected through the transformer, provides acceptable impedance matching for a wide range of loop lengths and wire gauges. For stability, the gain of the amplifier is forced to a low value when the central office termination becomes an open circuit.

11 Claims, 5 Drawing Figures

SHUNT NEGATIVE IMPEDANCE CONVERTER 12

SERIES NEGATIVE IMPEDANCE CONVERTER 13

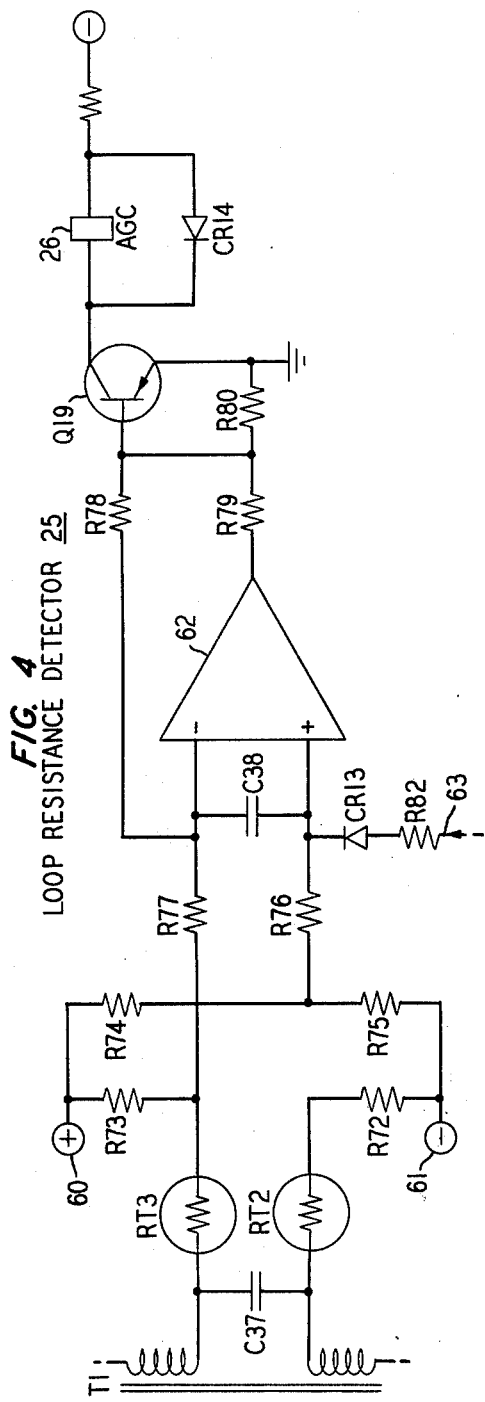
FIG. 4 LOOP RESISTANCE DETECTOR 25
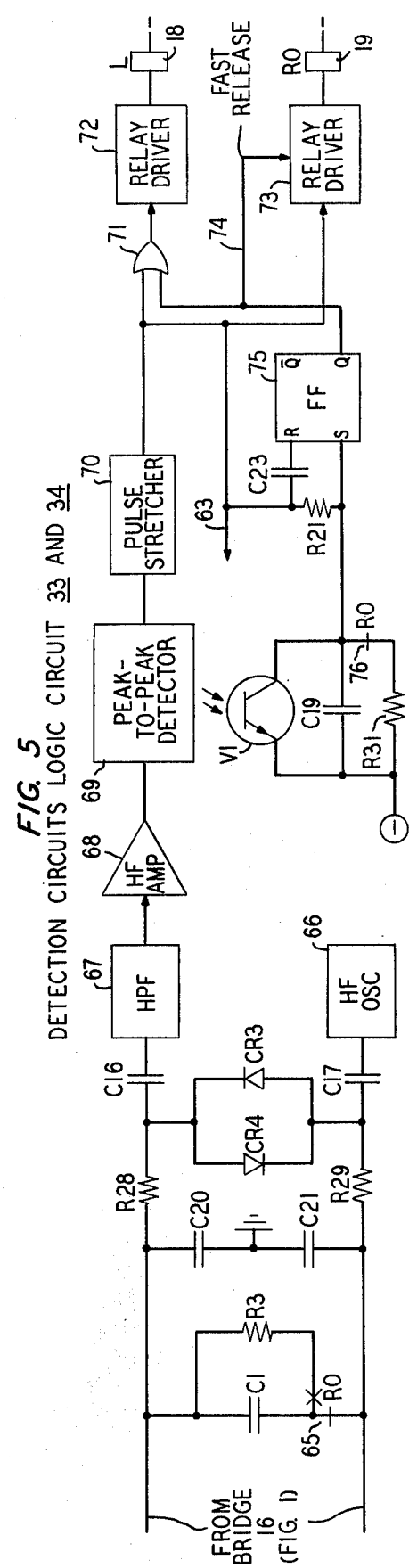
FIG. 5 DETECTION CIRCUITS LOGIC CIRCUIT 33 AND 34

TELEPHONE RANGE EXTENDER WITH GAIN

BACKGROUND OF THE INVENTION

1. Field Of The Invention

This invention relates to subscriber loop telephone service and, more particularly, to range extenders requiring no adjustments for use with diverse subscriber loops.

2. Description Of The Prior Art

Range extenders for telephone loops are known by means of which the conventional telephone service is provided to subscribers over loops having lengths greatly in excess of normal telephone loops. This is accomplished by providing voice frequency gain, sensitive detectors for off-hook and dialing currents, means for repeating the supervisory signals to the central office at increased current levels, and means for matching the impedance of long and sometimes loaded subscriber loops. Another use of range extenders is the substitution of higher gauge wire on subscriber loops, reducing the cost of the copper and compensating for the higher resistance with the range extender. Prior art range extenders are shown in J. L. Henry et al U.S. Pat. No. 3,508,009, granted Apr. 2, 1970, J. L. Henry et al U.S. Pat. No. 3,671,676, granted June 20, 1972, J. M. Nemchik U.S. Pat. No. 3,784,756, granted Jan. 8, 1974, and in the copending application of H. W. Ott Ser. No. 602,988, filed Aug. 8, 1975, now U.S. Pat. No. 4,004,102.

These prior art range extenders have heretofore required manual adjustment of gain and/or impedance matching characteristics in order to render them suitable for use with subscriber loops of varying lengths and wire gauge. This requirement for manual adjustment increases the cost of installation and initial setup of such range extenders when moved from loop to loop and, moreover, increases the risk of improper adjustment on a particular loop. The REG described in the above-mentioned copending application of H. W. Ott, although it requires no manual adjustment of the impedance matching network, nevertheless includes a complicated and expensive impedance detecting circuit to control complex impedance matching networks. This complex circuitry increases the size and cost of the range extender, thereby reducing the number of loops over which this device can be used economically.

Since range extenders are sometimes used on subscriber loops of intermediate lengths, and since the range extender circuitry must go through many transient states while setting up and breaking down telephone calls, a danger exists of the negative impedance amplifier being in a high gain state during a transient condition when the central office termination presents an open circuit. Under these conditions the amplifier can become unstable and create oscillations or other undesirable transients which might interfere with normal telephone use.

SUMMARY OF THE INVENTION

In accordance with the illustrative embodiment of the present invention, the negative impedance amplifier is configured in the form of a $\pi$ network having a negative impedance input shunt branch, a negative impedance series branch, and an impedance transforming output shunt path. Moreover, the frequency characteristics of both negative resistance converters and the impedance transformer are shaped so as to revert to positive impedance values in a controlled manner at the edges of the transmission band.

The $\pi$ configuration provides a higher primary impedance for the transformer which couples to the subscriber loop. The primary ampere turns of the transformer are correspondingly higher and can be used to buck out the loop ampere turns, resulting in a configuration that operates over a wide range of loop currents and yet without transformer saturation. This permits the range extender to be used on relatively short loops. Moreover, the $\pi$ configuration is less sensitive to component tolerances than other configurations since less use of bypass resistors is required to increase the current drawn from the central office.

One feature of the present invention is the exclusive use of normally-open relay contacts to control the gain of the negative impedance amplifier, thus permitting the use of miniaturized reed contacts with the resulting savings of power and costs in the range extender.

Another feature of the present invention is the placement of the loop impedance matching circuit (the line build-out network) on the primary side of the coupling transformer. This allows the magnetic element of the network to be a simple coil rather than a three winding transformer. The impedance matching network interacts with the negative impedance amplifier characteristic so as to match any gauge of telephone cable over all expected variations and in loop lengths.

BRIEF DESCRIPTION OF THE DRAWING:

In the drawing:

FIG. 4 is a detailed circuit diagram of a loop resistance detector suitable for use in the range extender of FIG. 1 for controlling the gain of the shunt and series negative impedance converters; and FIG. 5 is a circuit diagram of a dual mode current detector and logic circuit suitable for use in the range extender of FIG. 1.

DETAILED DESCRIPTION

Figure 1:
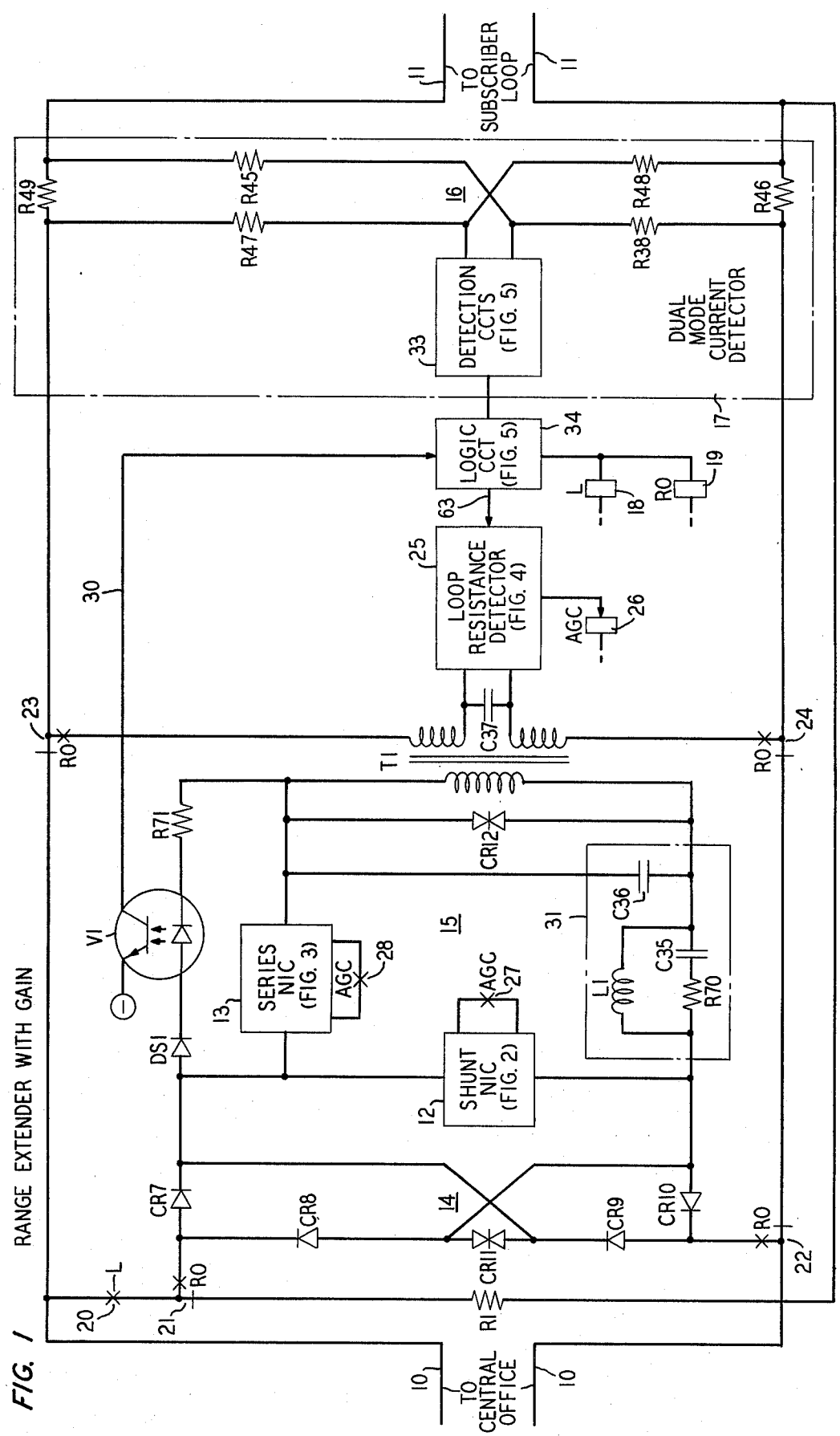
FIG. 1 is a general block diagram of a range extender with gain having a $\pi$ configured negative resistance amplifier in accordance with the present invention.

Referring more particularly to FIG. 1, there is shown a Range Extender with Gain (REG) connected to a telephone subscriber loop between the central office appearances 10 and the subscriber loop conductors 11. The REG of FIG. 1 comprises a negative impedance amplifier 15 including shunt negative impedance converter 12, series negative impedance converter 13, and transformer T1. The negative impedance amplifier is separated from the central office lines 10 by a polarity guard 14 including diodes CR7-10 and a surge protecting device CR11.

The negative impedance amplifier 15 is arranged in a $\pi$ configuration and includes transformer T1. The secondary windings of transformer T1 are connected through current sensing resistors R46 and R49 in dual mode current detector 17 to subscriber loop conductors 11. A bridge circuit 16 comprising resistors R38, R45, R47 and R48 is connected across sensing resistors R46 and R49 to provide a voltage to detection circuits 33 in dual mode current detector 17 which is proportional to the differential current flowing through resistors R46 and R49. The bridge arrangement provides a high impedance shunt to the subscriber loop and insures the cancellation of balanced longitudinal currents flowing through resistors R46 and R49.

Dual mode current detector 17 detects the current flowing in the subscriber loop to provide one input to the logic circuit 34 which, in turn, operates L relay 18 and R0 relay 19. Detector 17 operates in one of two modes: a so-called "slow mode" in which a lowpass filter is introduced into the detection path to prevent the circuits from responding to ringing or other transient signals on the line. The operation of RO relay 19 causes detector 17 to shift to a so-called "fast mode" which enables the accurate detection of dial pulses on loop 11. L relay 18 responds to these dial pulses by operating and releasing at a dial pulse rate.

When operated, L relay 18 closes L contacts 20 to connect resistor R1 across central office leads 10 and thus provide a shunt path to draw sufficient current from the central office battery to reliably operate the central office line relay. R0 relay 19, when operated, connects the central office appearances 10 through the polarity guard 14, the negative impedance amplifier 15 and transformer T1 to subscriber loop conductors 11, thus providing bilateral amplification of voice signals therebetween. This amplifier connection is accomplished through RO transfer contacts 21, 22, 23, and 24.

A loop resistance detector 25 responds to the resistance of the connected loop 11 to operate AGC relay 26 and adjust the gain of negative impedance amplifier 15. Thus AGC contacts 27 on shunt negative impedance converter 12 and AGC contacts 28 on series negative impedance converter 28 modify the gain characteristics of these two negative impedance converters so as to provide an appropriate gain for the measured loop resistance. Loop resistance detector 25 is connected between the secondary windings of transformer T1 and also serves as a supply point for a talking battery for loop 11. This battery has higher voltage than the normal central office talking battery, thus providing adequate telephone set transmitter current at extended loop ranges.

An optical isolator V1 comprising a light emitting diode and a phototransistor is used to detect breaks in the central office loop current which represent requests for tip party ground presence information to be used for Automatic Number Identification (ANI). Isolator V1 is connected in series with the light emitting diode DS1, which serves as a panel light, and a current limiting resistor R71, across series negative impedance converter 13. Central office current from conductors 10 flows through the closed L and RO relay contacts 20 and 21 and the polarity guard 14. A portion of this central office current also flows through optical isolator V1 to provide a control signal on lead 30 to the logic circuit 34. Lead 30 is used to latch L relay 18 and to quickly release RO relay 19 and thus provide a metallic path around amplifier 15 for performing a tip party ground test. After completion of the test, the signal on lead 30 changes state to permit RO relay 19 to reoperate and L relay 18 to follow dial pulses and maintain supervision.

An impedance matching network 31 comprising inductor L1, shunted by resistor R70 and capacitor C35 and including capacitor C36, is interconnected with the primary winding of transformer T1. Network 31 is used to provide an impedance match to loaded subscriber loops 11 of various lengths and wire gauge. In particular, the frequency characteristic of network 31, in combination with the frequency characteristics of the $\pi$ network including negative impedance converters 12 and 13, provide a reasonable impedance match over the entire voice frequency band and band edges for all 19 to 26 gauge, loaded telephone loops. More particularly, the combined impedance characteristics interact so as to match the negative impedance amplifier 15 to the loaded line impedance above 1 kHz and to decouple the line above 3.5 kHz. The fixed network 31 will match any fixed loading plan cable from 19 to 26 gauge satisfactorily. It will be noted that only a single inductor L1 is required for this purpose, thus reducing the size and cost of the range extender in comparison to prior art extenders having build-out networks on the secondary side of the transformer and requiring more complex networks including more than one inductor and usually requiring manual adjustment for different loops.

The operation of the range extender on both originating and terminating calls will now be described. While the customer is still on-hook, the dual mode current detector 17 is operating in its slow mode and is monitoring the loop current. When the subscriber lifts the handset off the switchhook and thus completes the loop circuit, the resulting loop current is observed by detector 17. After a slow mode delay of approximately 90 milliseconds, L relay 18 operates and then RO relay 19 operates. L relay 18 connects resistor R1 (approximately 1000 ohms) in shunt across the central office conductors 10. Current drawn by this shunt circuit and amplifier 15 when RO relay 19 operates causes the central office line relay to operate, thereby apprising the central office of the initiation of a call.

Shortly (10 milliseconds) after the operation of L relay 18, RO relay 19 operates to connect negative impedance amplifier 15 into the circuit and to change dual mode detector 17 to its fast mode. Shunting resistor R1 is removed from the circuit and the input impedance of amplifier 15 substituted. The input resistance of amplifier 15 is approximately the same value as resistor R1 (1000 ohms). The central office line relay therefore continues to operate and hold. RO contacts 23 and 24 also serve to connect a boosted talking battery in detector 25 to the subscriber loop, thereby increasing the current available to the subscriber telephone set.

At this point in the call, or at some later point, a tip party ground test is required for two-party lines equipped with ANI circuitry. This is accomplished by interrupting the central office battery to remove loop current from conductors 10. This condition is detected by optical isolator V1 and signalled to the logic circuit 34 via line 30. During the tip party ground test period, L relay 18 is held latched and RO relay 19 is released to permit the detection of longitudinal current in the subscriber loop.

When the tip party ground test is completed, central office battery is reconnected, this condition is detected by detector 17 and the RO relay 19 is reactivated. The subscriber can then begin to dial, interrupting the loop current, and permitting detector 17 to detect the dial pulses. L relay 18 operates in response to detector 17 and repeats these dial pulses by operating L contacts 20. RO relay 19 remains operated throughout dial pulsing due to the slow release characteristic in the RO relay driver. Alternatively, TOUCHTONE signals from a subscriber are amplified by amplifier 15 and forwarded to the central office.

When the called subscriber answers, amplifier 15 provides gain in both directions to boost the range of such calls. When the calling subscriber hangs up, detector 17 detects the termination of loop current and releases L relay 18 and RO relay 19. L relay 18 releases almost immediately while RO relay 19 releases after a delay period of approximately 150 milliseconds. The range extender of FIG. 1 is now in its quiescent state watching for the appearance of loop current.

On calls to the subscriber on loop 10, the central office applies 20 Hz ringing current to conductors 10. These signals are applied directly to loop conductors 11 through the normally closed portions of RO contacts 22, 23, and 24. Detector 17 is not responsive to these ringing signals due to its slow mode of response. When the subscriber answers the telephone, the resulting loop current is detected by detector 17 to operate L relay 18 and thus shunt central office conductors 10 with resistor R1. Shortly thereafter, RO relay 19 operates to connect negative impedance amplifier 15 into the loop and substitute the input impedance of the amplifier 15 for resistor R1. The current drawn from the central office by resistor R1 or amplifier 15 operates the central office ring trip relay which then removes the ringing signal from the line and completes the connection from the calling subscriber. L relay 18 and RO relay 19 remain operated throughout the conversation to provide bilateral voice frequency gain with amplifier 15. When the subscriber on loop 11 hangs up, detector 17 detects this condition as before and returns the range extender of FIG. 1 to its idle state.

Figure 2:
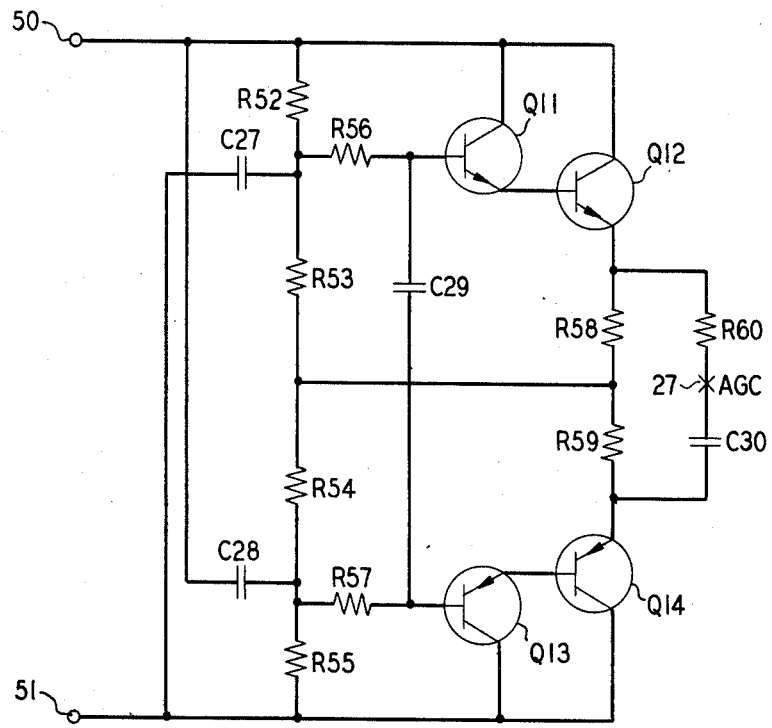
FIG. 2 is a detailed circuit diagram of the shunt negative impedance converter suitable for use in the range extender of FIG. 1.

Referring now to FIG. 2, there is shown a detailed circuit diagram of a shunt negative impedance converter suitable as converter 12 in FIG. 1. In general, the converter of FIG. 2 operates to change the positive resistance value of resistors R58, R59, and R60 into a negative value of approximately 1300 ohms which is shunted across the central office conductors 10. Resistors R52, R53, R54, and R55 serve to provide appropriate biasing levels for transistors Q11, Q12, Q13, and Q14. A frequency shaping network comprising resistors R56 and R57, and capacitor C29 serves to reduce the negative admittance of the negative impedance converter as frequency is increased. This insures that the amplifier is stable without oscillation outside of the voice frequency band and that the transition from the negative impedance characteristic to a positive impedance takes place in a gradual and controlled manner. Capacitors C27 and C28 provide positive feedback from the collectors of transistors Q14 and !12, respectively, to the base network of transistors Q11 and Q13. This feedback directly causes the impedance inversion of R58, R59, and R60. Transistor Q11 drives transistor Q12 while transistor Q13 drives transistor Q14. The resulting negative impedance seen between terminals 50 and 51 is approximately 1300 ohms when AGC contact 12 is in its closed condition. This permits an overall gain of amplifier 15 (FIG. 1) of about 6 dB.

When AGC contact 27 is open, and resistor R60 and capacitor C30 are not shunting resistors R58 and R59, the negative impedance between terminals 50 and 51 increases to permit an amplifier gain of about 3 dB. Capacitor C30 prevents R60 from changing the dc biasing of converter 12 when AGC relay contact 27 is closed. Capacitors 27 and 28 roll off the negative admittance of the converter of FIG. 2 at the lower edge of the voice frequency band.

It will be noted that only single normally open contact 27 is required to shift the negative impedance converter of FIG. 2. The AGC relay 26 (FIG. 1) can therefore be implemented with a miniaturized reed relay, thereby saving cost and power dissipation in the resulting range extender.

Figure 3:
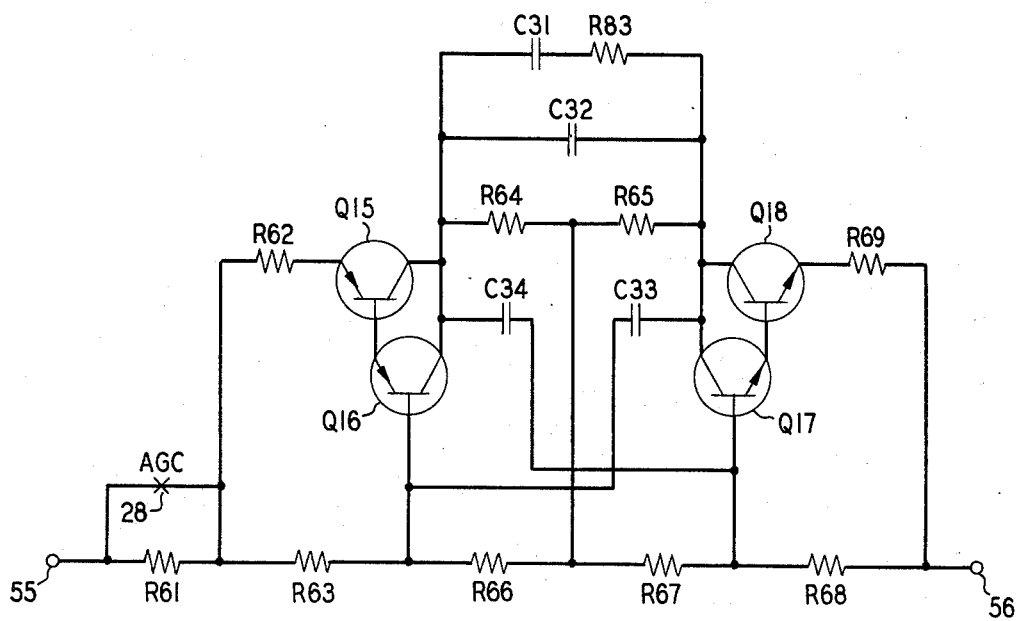
FIG. 3 is a detailed circuit diagram of a series negative impedance converter suitable for use in the negative impedance amplifier of FIG. 1.

In FIG. 3 there is shown a series negative impedance converter which may be used for converter 13 in FIG. 1. The circuit of FIG. 3 operates to provide a negative series impedance between terminals 55 and 56. Transistors Q15, Q16, Q17, and Q18 provide gain. The resistance of resistors R64, R65, and R83 are converted into a negative impedance which is effectively connected in series with the loop conductors. This negative impedance is modified below approximately 700 Hz by capacitor C31 to better match the low frequency characteristic of the connected cable without requiring a separate inductive network as is usually required. Resistors R62, R63, R66, R67, R68, and R69 serve to set the biasing levels for the various transistors and are powered directly from the connected telephone conductors. A resistor R61 is connected in series with the negative impedance converter to reduce the series negative impedance and thus reduce the amplifier gain to approximately 3 dB. When AGC relay 26 (FIG. 1) operates, AGC contact 28 operates to remove resistor R61 from the circuit, permitting the gain of the negative impedance amplifier to increase to 6 dB.

In general, the operation of AGC relay 26 results in a decrease in the magnitude of the shunt negative impedance and an increase in the magnitude of the series negative impedance. In combination, these changes change the gain of the overall amplifier 15 from 3 to 6 dB.

Referring to FIG. 4, there is shown a detailed circuit diagram of a loop resistance detector suitable for detector 25 in FIG. 1. As can be seen in FIG. 4, the subscriber loop is connected through transformer T1 to a boosted talking battery having a negative supply terminal 61 and a positive supply terminal 60. This voltage is applied from terminal 60 through voltage dropping resistor R73 and a thermistor RT3 to one secondary winding of transformer T1. Similarly, terminal 61 is connected through matching resistor R72 and thermistor RT2 to the other secondary winding of transformer T2. The positive temperature coefficients of RT2 and RT3 limit the loop current which can be drawn due to a loop fault (a short circuit, a ground, or a power cross) in the subscriber loop. Primary and secondary currents in transformer T1 are opposing so as to minimize the possibility of saturating the transformer on short, high current loops. This permits the range extender to operate satisfactorily on shorter loops of approximately 1000 ohms while allowing use of a small, inexpensive transformer T1.

Also connected between terminals 60 and 61 of the voltage supply is a voltage divider comprising resistors R74 and R75. The midpoint between resistors R74 and R75 is connected through resistor R76 to the positive input terminal of comparator 62. The midpoint of resistor R73 and thermistor RT3 is connected through resistor R77 to the negative input of comparator 62. Capacitor C38 is connected between the positive and negative input terminals of comparator 62 and serves to delay the operation of comparator 62 until capacitor C38 is sufficiently charged.

The voltage drop across resistor R73 is compared in comparator 62 with the fixed threshold voltage across resistor R74 in comparator 62. If the signal at the negative input to comparator 62 is more positive than the signal at the positive input terminal, comparator 62 produces a negative output voltage which is applied through resistor R79 to operate transistor Q19. Transistor Q19, when ON, operates AGC relay 26 to set the gain of the amplifier 15 (FIG. 1) at 6 dB. When the negative input to comparator 62 is less than the positive input, comparator 62 produces a near zero voltage output which turns transistor Q19 off and releases AGC relay 26, returning amplifier 15 to a 3 dB gain condition.

The detector of FIG. 4 switches the gain of amplifier 15 at about 2,000 ohms of loop resistance. Resistor R78 around comparator 62 provides a positive feedback to eliminate indecision near the 2,000 ohm resistance point by effectively shifting the bridge balance point by 80 ohms equivalent loop resistance. This is adequate to prevent indecision in the presence of up to 100 volts of 60 Hz longitudinally induced voltages on the loop.

A circuit path through diode CR13 and resistor R82 from lead 63 increases the threshold of comparator 62 to a sufficiently high level to force transistor Q19 to the OFF state. This technique is used to insure that amplifier 15 of FIG. 1 is in the 3 dB gain state during dial pulsing and other transient conditions, as will be discussed in connection with FIG. 5. This increases the stability of the range extender during critical transient states when loop current is not detected.

In FIG. 5 there is shown a block diagram of a dual mode current detector and logic circuit suitable for current detector 17 and logic circuit 34 in FIG. 1. This current detector and logic circuit is substantially identical to that shown in J. M. Nemchik U.S. Pat. No. 3,784,756, granted Jan. 8, 1974, and hence will be described only in general terms here. The resistive bridge 16 of FIG. 1 is connected across capacitor C1 in FIG. 5 which, in turn, is shunted by resistor R3, under the control of RO transfer contacts 65. Capacitor C1 gives the current detector its slow mode characteristic by requiring capacitor C1 to charge before current can be detected. When RO relay 19 operates, contacts 65 remove capacitor C1 from the circuit and cause it to be discharged through resistor R3, shifting the detector of FIG. 5 to its fast mode state.

A low-pass filter comprising resistors R28 and R29 and capacitors C20 and C21 prevent high frequency signals from being coupled to the subscriber loop. A high frequency oscillator 66 generates signals at a superaudible frequency (e.g., 18 kHz) which is supplied through capacitor C17 to diodes CR3 and CR4. A direct current flowing through diodes CR3 and CR4 varies the impedance of these diodes and thus the level of the high frequency signal transmitted therethrough. This high frequency is delivered by way of capacitor C16 through a high-pass filter 67 and a high frequency amplifier 68 to peak-to-peak detector 69.

The peak-to-peak voltage of the high frequency signal is an accurate measure of the direct current level in the subscriber loop. A pulse stretcher 70, having a preselected threshold, responds to the output of detector 69 to generate a 20 millisecond minimum pulse indicating the presence of a direct current signal in the subscriber loop exceeding the threshold. The output of pulse stretcher 70 is applied via lead 63 to the loop resistance detector of FIG. 4 to inhibit AGC relay 26 during intervals when loop current is not detected. This signal is also applied through OR gate 71 to energize driver 72 in order to operate L relay 18.

The output of pulse stretcher 70 is also applied directly to relay driver 73 to operate RO relay 19. Relay driver 73 has a slow release characteristic which can be overridden by a fast release signal on lead 74.

Flip-flop 75 is provided to latch relay 18 in the operated state and to hold relay 19 in the unoperated state during tip party ground tests. Thus, the Q output of flip-flop 75 is applied through OR gate 71 and relay driver 72 to latch L relay 18. The same signal is applied through lead 74 to relay driver 73 to release RO relay 19.

Flip-flop 75 is set whenever loop current detector 17 is operated and an open circuit appears in the central office loop of the range extender. This open circuit is detected by the phototransistor in optical isolator VI which ceases conducting when an open circuit occurs. This permits capacitor C19 to charge from the output of pulse stretcher 70 through resistor R21. Resistor R31 and normally closed contacts 76 prevent a charge from building up on capacitor C19 unless the negative impedance amplifier 15 (FIG. 1) is in the subscriber loop. When RO relay 19 is released, capacitor C19 is maintained in a discharge state preventing flip-flop 75 from being set.

In summary, then, flip-flop 75 can be set only if the following three conditions are present:
1. Pulse stretcher 70 is operated, indicating the presence of subscriber loop current;
2. RO relay 19 is operated and the amplifier 15 is in the loop transmission path; and
3. The phototransistor in isolator VI is off, indicating that the central office current has terminated in preparation to applying tip party ground test. If all of these conditions are met, flip-flop 75 is set, latching L relay 18 and releasing RO relay 19.

The release of RO relay 19 releases RO contacts 23 and 24 in FIG. 1 to remove battery from the local loop. Following the tip party ground tests, central office battery is reapplied to conductors 10, causing a current to flow in the subscriber loop. This current is detected by the current detector 17 of FIG. 5, resulting in the reoperation of pulse stretcher 70. The leading edge of the output of pulse stretcher 70 is coupled through capacitor C23 to reset ANI flip-flop 75, thereby permitting RO relay 19 to operate and L relay 18 to track dial pulses.

What is claimed is:
1. A telephone range extender comprising
means for connecting said range extender to a telephone central office;
means for connecting said range extender to a telephone subscriber loop;
a subscriber loop resistance detector connected to said subscriber loop connecting means; and
a negative impedance bilateral amplifier connected in a $\pi$ configuration, said amplifier comprising
a central office side shunt negative impedance converter;
a series negative impedance converter; and
a subscriber side impedance transformer;
each of said negative impedance converters being adjustable in response to said subscriber loop resistance detector.

2. The telephone range extender according to claim 1 wherein each said negative impedance converter includes a single normally open relay contact; and relay means for closing said normally open contacts in response to a preselected output level of said resistance detector.

3. The telephone range extender according to claim 1 wherein each of said negative impedance converters comprises a plurality of transistors connected in series with a positive impedance;

a voltage divider coupled to said conductors for biasing said transistors from the direct current voltage on said conductors; and means for changing the value of said positive impedance.

4. The telephone range extender according to claim 1 further including a passive fixed impedance matching circuit coupled to said $\pi$ configuration.

5. The telephone range extender according to claim 4 wherein the combination of the negative impedances of said converters and the positive impedances of said passive impedances is matched in the frequency domain to the impedance of said subscriber loop over a range of cable gauges and loop lengths without any adjustment of said passive impedances.

6. A bilateral amplifier in the form of a $\pi$ network comprising a shunt negative impedance converter;

a series negative impedance converter;

a shunt impedance transformer; and a fixed impedance matching network connected between said shunt negative impedance converter and said shunt impedance transformer.

7. The bilateral amplifier according to claim 6 wherein said impedance transformer comprises a transformer coupled to a transmission line.

8. The bilateral amplifier according to claim 7 further including impedance detecting means responsive to the resistance of said transmission line for adjusting the gain of said amplifier.

9. The bilateral amplifier according to claim 8 wherein said means for adjusting gain comprises only normally open contacts.

10. The bilateral amplifier according to claim 6 wherein said shunt negative impedance converter further comprises means for reducing the negative admittance of said shunt negative impedance converter as frequency is increased.

11. The bilateral amplifier according to claim 6 wherein said series negative impedance converter further comprises means for increasing the negative impedance of said series negative impedance converter as frequency is reduced.

* * * * *